June 22, 1943.  L. A. LARSON ET AL  2,322,243
MEAT TENDERIZING MACHINE
Filed June 19, 1940  2 Sheets-Sheet 2
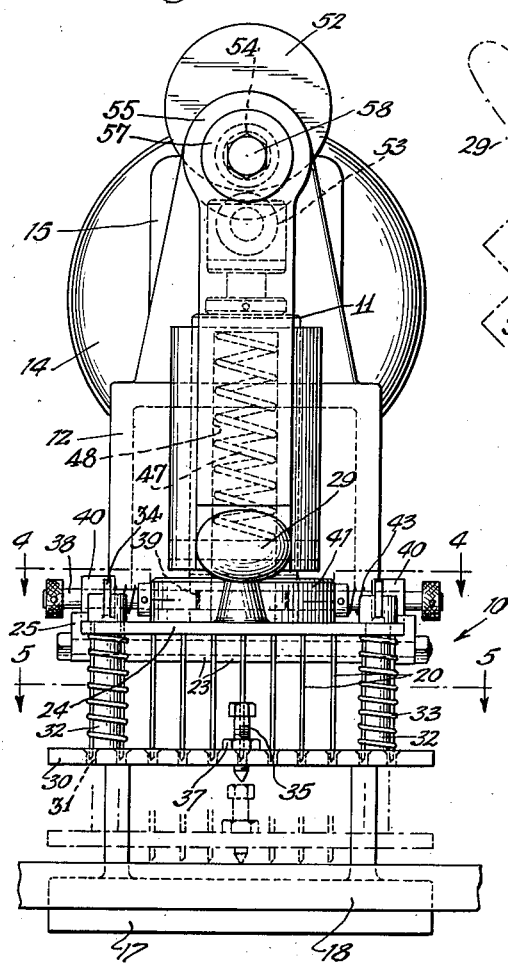
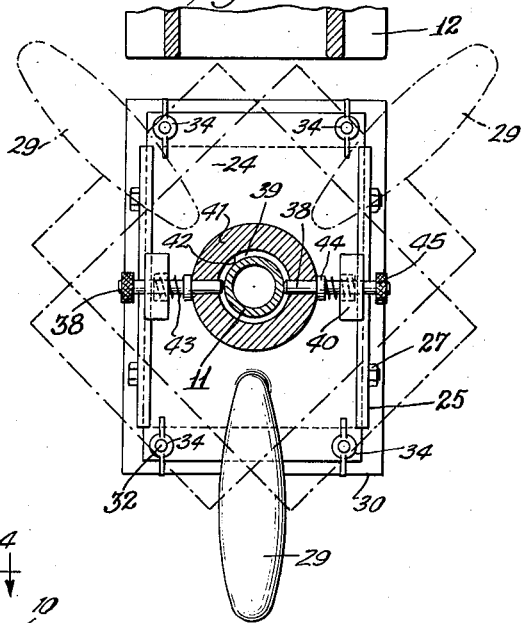
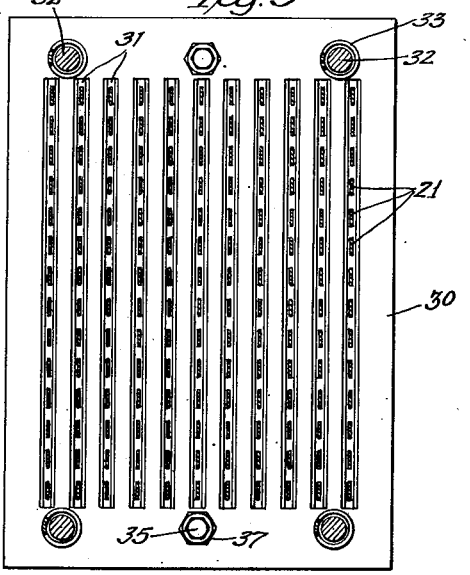
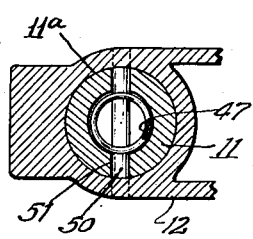
Inventors:
Leonard A. Larson
Leo W. Hart
By Parker, Carleon, Pitzner & Hubbard
Attorneys Patented June 22, 1943

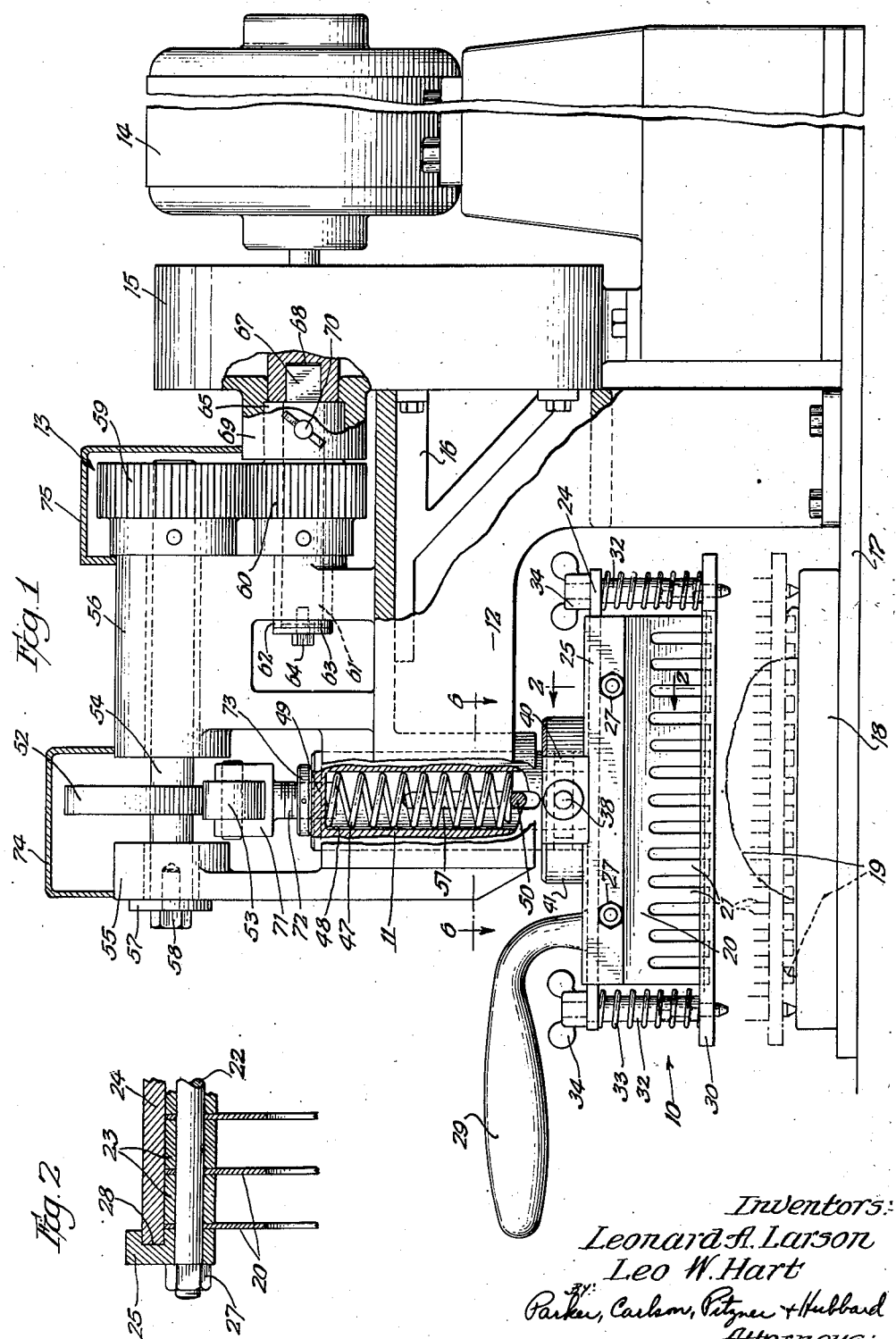

2,322,243

UNITED STATES PATENT OFFICE 2,322,243

MEAT TENDERIZING MACHINE

Leonard A. Larson, Chicago, Ill., and Leo W. Hart, Milwaukee, Wis., assignors to Kwik Steak Machine Co. of America, Milwaukee, Wis., a corporation of Wisconsin Application June 19, 1940, Serial No. 341,254

11 Claims. (Cl. 17—25)

This invention relates to improvements in meat tenderizing machines and more particularly to such machines for breaking down the fiber structure of meat by subjecting it to a multiple-incision cutting action.

The principal difference between prime quality steak cuts of meat and the other far more abundant and proportionally less desired and cheaper cuts as well as lower grades of meat resides, of course, in the tougher fiber structure. From a nutritional standpoint, however, there is little if any difference between the various cuts or grades of meat. By breaking down the fiber structure or tenderizing the meat as by a more or less uniform and repeated cutting action to sever the fibers into unobjectionable short lengths the cheaper cuts and grades of meat can be rendered practically as desirable from an epicurean standpoint as the more expensive cuts.

It has heretofore been proposed to tenderize by subjecting the more fibrous meat to the cutting action of manually actuated multi-knife cutters. The prior machines for this purpose have been slow and oftentimes cumbersome and laborious to operate. Some have not been as sanitary as desirable, or have been of such complicated or inconvenient mechanism as to encourage neglect of proper cleaning. Generally also, the prior machines and methods have been limited to the treatment of whole steaks only.

A general object of the present invention is to provide an improved meat tenderizing machine in which the cutting means is power driven for relatively high speed operation.

Another object is to provide a machine of this character having novel driving means.

Still another object of the invention is to provide such a machine in which the cutter head mechanism embodies improved means for automatically returning the cutter head to an elevated position after a cutting operation.

A further object of the invention is to provide a novel method of and means for uniting and tenderizing discrete pieces and particles of meat into full steaks.

A still further object of the invention is to provide in a machine of the foregoing general character means for applying flattening pressure to the meat undergoing treatment.

Yet another object of the invention is to provide a readily adjustable cutter head and pressure applying means.

Additional objects of the invention are to provide an improved cutter head assembly, and an improved quick detachable connection between the cutter head and its plunger.

Other objects and advantages will become apparent in the following description and from the accompanying drawings in which:

Figure 1 is a fragmental side elevational view of a tenderizing machine embodying the features of the invention and with parts broken away and in section for clarity of illustration.

Fig. 2 is a transverse vertical sectional view through one side of the cutter head taken substantially along line 2—2 of Fig. 1.

Fig. 3 is a front elevational view of the machine.

Fig. 4 is a horizontal sectional view taken substantially along line 4—4 of Fig. 3 and showing the top of the cutter head.

Fig. 5 is a horizontal sectional view through the cutter head assembly taken substantially along line 5—5 of Fig. 3.

Fig. 6 is a fragmentary horizontal sectional detail view through the cutter head plunger and its guideway, taken substantially in the plane of line 6—6 of Fig. 1.

While the invention is susceptible of various modifications and alternative constructions, we have shown in the drawings and will herein describe in detail a preferred embodiment, but it is to be understood that we do not thereby intend to limit the invention to the specific form disclosed but intend to cover all modifications and alternative constructions falling within the spirit and scope of the invention as expressed in the appended claims.

A tenderizing machine according to the present invention is adapted to be power driven at relatively high speed. It has a reciprocating cutter assembly or head including a pressure and stripper plate so arranged that throughout the time the tenderizing knives penetrate the meat in each cutting stroke, the meat is pressed down upon the meat board. On each return stroke the pressure and stripper plate rises from the surface of the meat and permits rotation of the head so that on the next cutting stroke the knives will penetrate the meat at a different angle. As the cutting under pressure proceeds, pieces of meat of varying thickness become uniformly flattened steaks, the thickness of which is determined by adjustments for limiting the pressure approach of the combined pressure and stripper plate. This cutting and pressing treatment is effective not only for beef but is also singularly successful with veal which ordinarily is difficult to tenderize because of the resilient or "rubbery" character of veal fibers. In fact, it has been found that by this treatment small irregular pieces of meat, whether beef or veal, are successfully tenderized and united into what to all intents and purposes appears and may be handled like a tenderized one-piece steak. Moreover, coarse ground meat subjected to the pressure and tenderizing treatment similarly agglomerates to form a complete steak hardly discernible from a tenderized whole piece of meat. The agglomerate steak is of unusually smooth and uniform texture and juiciness substantially different from hamburger in which ground meat is merely pressed into shape.

Referring more particularly to the drawings, a meat tenderizing machine embodying the features of the invention may comprise a cutter assembly or head 10 which is carried by a stem or plunger 11 mounted for vertical reciprocation within a bore or guideway 11ᵃ (Fig. 6) formed within a forwardly overhanging portion of a supporting frame 12. The plunger 11 is adapted to be reciprocably actuated by power driving means generally designated 13. In the present instance the driving means 13 is of rotary type and is arranged to be driven by a suitable prime mover such as an electric motor 14 acting through the medium of a speed reducing transmission which is assembled within a casing 15.

In the form illustrated, the machine may comprise two separable units, the frame 12 together with the cutter head 10 and the driving means 13 constituting one unit which for convenience may be designated the "tenderizer unit," and the motor 14 and speed reducer assembly 15 forming the other unit which may be termed the "power unit." Through this arrangement the driving and power units may be detached and the power unit used for driving other devices such as a meat chopper or grinder (not shown). A bracket 16 which projects forwardly from the transmission casing 15 for supporting the grinder is utilized also for assisting in cooperatively supporting the tenderizer unit and for this purpose projects into engagement within the supporting frame 12 which for this purpose may be formed as a hollow casting. Both units may conveniently be mounted in proper operative relation upon a base plate 17. The base plate 17 may project forwardly to underlie the cutter head 10 and to provide a convenient support for a slidable meat board 18 upon which is placed meat 19 to be treated. The meat board 18 may be of any desired length and adapted to carry a substantial number of steaks.

The cutter head 10 carries a series of elongated knife blades 20. Each blade is slotted inwardly from its cutting edge to form a series of equally spaced narrow bladelets 21. All of the blades 20 are secured together by means of tie rods 22 with the cutting edges of the bladelets 21 arranged in a uniform plane. The tie rods 22 extend through the back margins of the blades and through spacer blocks 23 (Fig. 2) by which the blades are maintained in equally spaced parallel relation. The knife assembly is detachably secured to the face of a rectangular head plate 24 by means of clamping and attachment bars 25 which are secured in place at the opposite sides of the knife blade assembly on the outer ends of the tie rods 22 and are forced inwardly into clamping relation by means of nuts 27. Each of the attachment bars 25 has a portion projecting beyond the back edge plane of the knife blades 20 and is formed with an inwardly facing longitudinal groove 28 to receive the respective side edge of the head plate 24 removably. Through this arrangement the knife assembly is adapted to make a plurality of parallel series of uniform, short incisions into the meat being treated. Should any blade become damaged or require sharpening, it can easily be released from the assembly by unscrewing the nuts 27 and removing the tie rods 22. A handle 29 may be mounted to project forwardly from the head plate 24 for convenience in manipulating the cutter head.

In order to place the meat under pressure while it is being cut by the knife blades, means is provided such as a rectangular pressure plate 30 which forms a part of the tenderizing head 10 (Figs. 1, 3 and 5). This pressure plate 30 is formed with a plurality of spaced parallel slots 31 just wide enough for passage therethrough of the knife blades 20 and is supported in spaced parallel alinement with the head plate 24 by means of a plurality of guide rods 32, herein shown as four in number located one adjacent to each corner of the plates. The guide rods are fixedly secured to the pressure plate 30 and extend slidably through portions of the head plate 24 which extend beyond the opposite ends of the knife blades 20. Resilient means such as helical compression springs 33 encircling the guide rods 32 act between the plates to normally maintain a maximum adjusted separation therebetween. Wing nuts 34 threaded onto the ends of the guide rods 32 projecting above the head plate 24 serve to draw up the guide rods against the compression of the springs 33 to define the adjusted spacing between the head and pressure plates. By preference this spacing is such that in the inactive or non-cutting condition of the tenderizer head 10 the cutting tips or edges of the bladelets 21 are protectively drawn up into the slots 31.

As a result of the resilience afforded by the springs 33, the pressure plate 30 may yield when in the cutting stroke of the tenderizing head 10 the plate bears upon and is held against full downward movement by the meat being treated. This allows the bladelets 21 to project through the pressure plate into the meat as shown in dot-dash outline in Figs. 1 and 3. Upon release of the tenderizing head 10 for return to the initial or inactive position, the springs 33 cause the pressure plate 30 to automatically assume its adjusted or extended position relative to the head plate 24 so that the bladelets 21 are retracted and stripped clean of any adhering particles of meat while the meat is still under at least some pressure.

Means such as a pair of stop screws 35 may be provided for limiting the approach of the pressure plate 30 to the meat board 18 whereby to determine the extent of flattening of the meat by the pressure plate. These stop screws are threaded through the pressure plate 30, preferably adjacent to the front and rear ends thereof, and are arranged to engage the meat board 18 when the pressure plate has reached the preferred spaced relation to the board. In this manner a uniform thickness can be predetermined for the treated steaks. The stop screws may be held in adjusted condition by means of lock nuts 37.

A detachable connection between the tenderizing head 10 and the carrying stem or plunger 11 is provided by resiliently retractible plungers or pins 38 (Figs. 3 and 4) carried by the head plate 24 and extending endwise into a peripheral connecting groove 39 at the lower end of the plunger. In the present instance the connecting pins 38 are two in number conveniently located in coaxial alinement at opposite sides of the head 10 and are slidably mounted in upstanding bosses 40 rising fixedly from the upper face of the head plate 24. The inner end portions of the connecting pins 38 extend through an upstanding central annular flange or hollow boss 41 on the head plate 24 which provides a sliding socket 42 for the lower end of the plunger 11. Springs 43 act between the bosses 40 and collars 44 on the pins 38 to urge the pins normally toward engagement within the connecting groove 39. At their outer ends the connecting pins may be equipped with knurled heads 45 to facilitate manual retraction of the pins for releasing the tenderizing head 10 when it is desired to remove the same as for cleaning. Thus, the tenderizing head may very conveniently be kept in a thoroughly sanitary condition. The pin and groove connection, moreover, permits the tenderizing head to rotate freely about the plunger 11.

Means is provided for normally urging the plunger 11 upwardly to support the tenderizing head 10 in spaced relation to the meat board 18, that is, in the inactive or non-cutting position. Herein such means comprises a helical compression spring 47 (Figs. 1 and 6) which is housed within a suitably dimensioned axial bore 48 in the plunger and arranged to exert a continuous substantially axial upthrust upon the plunger. The bore 48 preferably extends inwardly from the lower end of the plunger 11 and is closed at the upper end by a cross head 49 against which the upper end of the spring 47 bears. At its lower end the spring rests upon a stationary transverse pin or abutment 50 which has its ends fixedly secured in the adjacent portion of the frame 12 at opposite sides of the plunger and extends through diametrically alined longitudinal slots 51 therein. The slots 51 are of such length that they permit a full range of reciprocal movement for the cutting strokes of the plunger 11. As a result of this arrangement, when the plunger 11 is driven downwardly in a cutting stroke by a counterthrust in opposition to the spring 47, the latter is placed under compression. Upon release of the counterthrust, the compressed spring 47 automatically returns the plunger and tenderizing head to the inactive or non-cutting position. It may also be noted that the pin 50 holds the plunger 11 against rotation.

Smooth, uniform translation of the rotary motion of the driving means 13 into the reciprocal motion of the plunger 11 is effected in the present instance by means such as a circular disk cam 52 which rides against antifriction means such as a roller 53 mounted at the upper end of the plunger 11. The cam 52 is mounted eccentrically upon a shaft 54 and in its rotation intermittently thrusts the plunger 11 axially down in opposition to the compression spring 47 to drive the tenderizing head into cutting position. This driving arrangement is without dwells in motion, is silent and entirely free of jarring vibrations.

The shaft 54 extends in a front to rear direction over the plunger 11 and is journaled at the front of the supporting frame 12 in a short bearing 55 and at the rear in a longer bearing 56. A retainer disk 57 is secured to the forward extremity of the shaft 54 by means of a bolt 58, and a pinion 59 is secured to the rear end of the shaft. Meshing with the pinion 59 is a driving gear 60 carried by a stub shaft 61 which is journaled in a bearing sleeve 62 within the adjacent part of the frame member 12. A retaining disk 63 is secured to the forward end of the stub shaft 61 by means of a bolt 64. The rear or outer end portion of the stub shaft 61 extends beyond the driving gear 60 through a sleeve bearing 65 and has a squared off end portion 67 which fits into a transmission socket member 68 within the transmission housing 15. The sleeve bearing 65 is releasably secured within a forwardly projecting hollow boss 69 by means such as a wing-head set screw 70. This arrangement permits convenient removal of the sleeve bearing when the tenderizing unit is detached from the power unit to permit other uses of the latter.

From time to time it may become necessary to adjust the length of the plunger 11 for varying the approach of the cutter blades to the meat board 18. For this purpose, the plunger may be formed in two sections, the upper section being in the form of a readily accessible forked head 71 which has a stem 72 threaded into the cross head 49 and arranged to be locked in any adjusted position by means of a lock nut 73. Thus, to increase or decrease the overall length of the plunger 11 the lock nut 73 is loosened and the head 71 turned to the desired relative position. The adjusted condition is then maintained by resecuring the lock nut 73.

As a protective measure, moving parts of the driving mechanism such as the cam 52 and the pinions 59 and 60, may be enclosed by removable casings or hoods 74 and 75, respectively. These hoods are preferably constructed to be slid on or off.

In the operation of the machine, the meat 19 to be treated is placed upon the meat board 18 under the tenderizing head 10 and the motor 14 is started to actuate the driving means 13. Thereupon, the driving cam 52 is rotated at high speed in an eccentric path which alternately causes the plunger 11 and tenderizing head 10 to be forced downwardly in a cutting stroke and then released for return by the spring 47 to non-cutting position, the transition from thrust to counter-thrust and return being quite smooth. In each cutting stroke the combined pressure and stripper plate 30 presses against the meat and the bladelets 21 then quickly cut into the meat. At the end of the cutting stroke the bladelets are retracted and stripped clean before the plate 30 is released from the meat and returned to the inactive position. Between each cutting stroke the tenderizing head 10 may be rotatably shifted about its axis by means of the handle 29 so that at the next stroke the bladelets will cut into the meat at a different angle. Such shifting may, in the present compact embodiment of the invention, be effected through any preferred range within an arc of roughly 240° as indicated generally by the dot-dash outline positions in Fig. 4, the only limitation upon full rotation being the rear or standard portion of the frame 12 which is in the way of the projecting handle 29. In practice it has been found that good results are obtained where the cutting strokes of the tenderizing head 10 are at the rate of up to 220 per minute and the head is swung gradually in an arc of about 90° in the treatment of each steak. As a result, the meat may quickly be subjected to a great many cuts at a large number of different angles and the fiber structure of the meat is thus thoroughly and uniformly broken down.

From the foregoing it will be apparent that the present invention provides an improved efficient tenderizing machine wherein the tenderizing head may be smoothly and uniformly power driven at high speed. The relationship of the driving means and the tenderizing head is such that the latter is automatically returned to inactive or non-cutting position after each cutting stroke. For sanitary purposes the tenderizing head may easily and quickly be detached from the machine for cleaning purposes, and the arrangement of the head is such that it can easily be dismantled for repair or sharpening of the blades. By placing the meat under pressure simultaneously with cutting, not only is the tenderizing of whole pieces of meat facilitated but it is also possible to tenderize and unite separate pieces or particles of meat into a substantially complete, uniformly tender steak. The various parts of the machine are comparatively simple in construction and easy and inexpensive to make so that the machine can be built at reasonable cost.

We claim as our invention:

1. A machine of the character described comprising, in combination, a framework, a vertically reciprocable hollow plunger carried by said framework, a meat-cutting head at the lower end of said plunger, means for reciprocably driving said plunger, means tending to urge said plunger upwardly when it is in the lowermost position of its reciprocal cycle including a compression spring element within the plunger, and abutment means held immovable relative to said plunger engaged by the lower end of said spring element.

2. A machine of the character described comprising, in combination, a framework, a vertically reciprocable hollow plunger carried by said framework, a meat-cutting head carried by the lower end of said plunger, means for reciprocably driving said plunger, a compression spring within said plunger, said plunger having diametrically opposite longitudinal slots therein adjacent to the lower end of said spring, and a transverse pin fixedly supported by said framework extending through said slots and forming an abutment for the lower end of said spring.

3. In combination in a meat tenderizing machine of the character described, a supporting frame having a forwardly projecting overhanging portion, a vertically reciprocable plunger carried by said overhanging portion and having a relatively rotatable tenderizing head at its lower end, said plunger having an axial bore therein and diametrically alined longitudinal slots at opposite sides of said bore, compression spring means within said bore, a pin extending through said slots and fixedly anchored in said overhanging portion to hold said plunger against rotation and providing an abutment for one end of said spring means, the opposite end of said spring means bearing against said plunger, antifriction means carried by the upper end of said plunger, and a rotary cam cooperating with said antifriction means to actuate said plunger against the compression of said spring means for moving said head into tenderizing position.

4. In combination in apparatus of the character described, a supporting frame, a vertically reciprocable hollow plunger carried by said frame, a meat-cutting head operable in the reciprocations of said plunger, an upthrust helical compression spring within said plunger, a stationary abutment member relative to which said plunger is movable and having the lower end of said spring in engagement therewith, means for actuating said plunger in opposition to said spring to drive said head into meat-cutting position, and axially movable adjusting means for varying said meat-cutting position carried by the upper end of said plunger and extending axially through the upper end of said spring.

5. In combination in a meat tenderizing machine of the character described, a vertically reciprocable plunger, a tenderizing head carried by the lower end of said plunger for acting on meat supported therebelow, means providing a fixed abutment adjacent the lower portion of said plunger, a compression spring bearing at its lower end against said abutment and bearing at its upper end against an upper end portion of said plunger to place the plunger under continuous upthrust for normally holding said head in the inactive position, and counter-thrust means for driving said head into tenderizing position in opposition to said upthrust means.

6. A meat tenderizing machine comprising, in combination, a vertically reciprocating member, a head plate supported by the lower end of said reciprocating member, a knife blade assembly including a plurality of bladelets and spacers secured together by means of tie bolts to form a self-contained unit, and means on said unit for detachably securing the same to said head plate comprising attachment bars engageable with the edges of said head plate and arranged to be clamped against such edges by said tie bolts.

7. A meat tenderizing machine according to claim 5 wherein the counter-thrust means comprises a circular cam eccentrically mounted upon a rotatable drive shaft and operatively disposed edgewise over the upper end of the plunger.

8. A meat tenderizing machine according to claim 5 in which the plunger includes means adjacent to the counter-thrust means for adjusting the extent to which the tenderizing head is driven into the tenderizing position.

9. A meat tenderizing machine according to claim 5 wherein a stationary frame supports the plunger and fixed abutment and has spaced bearing means located above and at respective opposite sides of the plunger, and the counter-thrust means comprises a driven shaft journaled in said bearing means and overlying said plunger with the axis of the shaft and the axis of the plunger perpendicularly intersecting, a plunger-reciprocating cam being fixed upon said shaft and bearing downwardly edgewise upon the upper end of the plunger.

10. A meat tenderizing machine according to claim 5 wherein a driven shaft is journaled on a horizontal axis intersecting the axis of the plunger above the upper end of the plunger and has a plunger-reciprocating cam member fixed thereon as a unit to provide the counter-thrust means referred to, the upper end of the plunger having a forked head, and an anti-friction roller supported by the forked head and rotatably engaging the cam member.

11. A meat tenderizing machine as set forth in claim 5 wherein the counter-thrust means includes a driven cam, and the upper end of the plunger has a head carrying an anti-friction roller cooperating with the cam, said head being longitudinally adjustable relative to the remainder of the plunger so as to decrease or increase the length of the plunger and thus control the approach of the tenderizing head to a meat support in the tenderizing position of the head.

LEONARD A. LARSON.
LEO W. HART.